United States Patent [19]

Wang

[11] Patent Number: 5,093,465
[45] Date of Patent: Mar. 3, 1992

[54] POLYAMIDE CONTAINING SPIRODILACTAM MOIETIES

[75] Inventor: Pen-Chung Wang, Houston, Tex.

[73] Assignee: Shell Oil Company, Houston, Tex.

[21] Appl. No.: 546,184

[22] Filed: Jun. 29, 1990

[51] Int. Cl.$^5$ ............................................. C08G 69/26
[52] U.S. Cl. ..................................... 528/335; 528/176; 528/211; 528/229; 528/323; 528/354
[58] Field of Search ............... 528/335, 323, 176, 211, 528/229, 354

[56] References Cited

U.S. PATENT DOCUMENTS

| | | | |
|---|---|---|---|
| 2,149,678 | 3/1939 | Hovey et al. | 260/2 |
| 2,195,570 | 4/1940 | Hovey et al. | 260/65 |
| 2,279,752 | 4/1942 | Jacobson | 260/78 |
| 2,987,502 | 6/1961 | Ferstandig et al. | 260/63 |
| 3,408,334 | 10/1968 | Caldwell et al. | 360/78 |
| 3,637,602 | 1/1972 | Conciatori | 260/78 |
| 3,778,411 | 12/1973 | Emerick et al. | 260/65 |
| 4,064,086 | 12/1977 | Cowsar et al. | 260/29.2 |
| 4,595,745 | 6/1986 | Nakano et al. | 528/125 |
| 4,939,251 | 7/1990 | Wang | 540/489 |
| 4,968,770 | 11/1990 | Wang | 528/335 |

OTHER PUBLICATIONS

Pariza et al., *Synthetic Communications*, 13(3), pp. 243-254 (1983).

Primary Examiner—Harold D. Anderson

[57] ABSTRACT

Novel polymers containing amide moieties are produced by reaction of a spirodilactam precursor selected from 4-oxoheptanedioic acid compounds or 1,6-dioxa [4.4] spirodilactones, a primary diamine and an aromatic, aliphatic or alicyclic dicarboxylic acid compound. The polymer products have relatively high glass transition temperature.

6 Claims, No Drawings

POLYAMIDE CONTAINING SPIRODILACTAM MOIETIES

FIELD OF THE INVENTION

This invention relates to a class of novel polyamide polymers characterized by the presence of amide linkages within the polymer chain. More particularly, the invention relates to a linear, alternating polymer in which moieties derived from a primary diamine alternate with moieties derived from a dicarboxylic acid compound and with moieties of a 1,6-diaza [4.4] spirodilactam.

BACKGROUND OF THE INVENTION

The class of polyamide polymers is broadly well known in the art. A commercial example of this class of polymers is the polyamide illustratively produced from hexamethylenediamine and adipic acid known as Nylon 66. The nature of the reaction product of a carboxylic acid or related compound will vary, however, depending upon the chemical nature of the acid compound and the amine.

The reaction of a ketobenzoic acid, i.e., benzoylbenzoic acid, and diamines is shown by Hovey et al, U.S. Pat. No. 2,149,678 and U.S. Pat. No. 2,195,570. The reaction of aromatic dicarboxylic acids and photosensitive diamine compounds is shown by Nakama et al, U.S. Pat. No. 4,595,745 Caldwell et al. U.S. Pat. No. 3,408,334, describe the reaction of dicarboxylic acids and diamines in the presence of a tin compound as catalyst. Reaction of α,β-unsaturated aromatic dicarboxylic acids and primary and secondary diamines is disclosed by Conciatori, U.S. Pat. No. 3,637,602. The production of polyamideimides by reactions including that of a diacid and polyamides is shown by Emerick et al, U.S. Pat. No. 3,778,411. The use of a dicarboxylic acid of additional functionality, 4-oxoheptanedioic acids, in the production of polymers is shown by Ferstandig, U.S. Pat. No. 2,987,502, but reaction was with a polyhydroxylic alcohol and the product was a polyester. U.S. Pat. No. 2,279,752 describes linear polyamides having recurring —NHRCO— units such that a keto group, present in at least one reactant, is in the divalent organic radical separating the recurring amine units of the polyamide.

A class of compounds that functions in some ways similar to dicarboxylic acids is the class of 1,6-dioxa [4.4] spirodilactones. The simplest member of this class, 1,6-dioxaspiro[4.4]nonane-2,7-dione, is known and has been prepared, among other procedures, by the process of Pariza et al, *Synthetic Communications*, Vol. 13(3). pp. 243-254 (1983). These spirodilactones have demonstrated utility as curing agents to produce cured compositions which do not shrink upon curing. This property probably results from opening of the spirodilactone rings during the curing process. It is characteristic of the spirodilactone ring system that reaction with active hydrogen compounds tends to produce ring-opened products, as further evidenced by the above Pariza et al article. See also Cowsar et al, U.S. Pat. No. 4,064,086 One reaction of 1,6-dioxaspiro[4.4]nonane-2,7-dione in which the ring system is maintained is described and claimed in U.S. Pat. No. 4,939,251 wherein the spirodilactones are reacted with hydroxy-containing primary amino compounds to produce monomeric substituted spirodilactams.

The polyamide polymers of the present invention are terpolymers as are many other polymeric polyamides. However, because of the relatively low melting point or glass transition temperatures exhibited by many polymeric polyamides, the thermoplastic polyamides are not generally useful as engineering thermoplastics where exposure to elevated temperatures is likely to be encountered. It would be of advantage to provide novel polymeric polyamides having relatively high glass transition temperatures. It would be of further advantage to provide processes employing dicarboxylic acid compounds or alternatively spirodilactones to produce such polymeric polyamides.

SUMMARY OF THE INVENTION

The present invention provides a linear, alternating terpolymer which contains amide linkages within the polymer chain. More particularly, the invention provides a class of novel polyamide polymers wherein moieties corresponding to the non-amino portion of a primary diamine alternate with moieties of an amide derived from an aromatic, aliphatic or alicyclic dicarboxylic acid compound and with moieties of a 1,6-diaza [4.4] spirodilactam. The invention additionally provides a method for the production of such polymers.

DESCRIPTION OF THE INVENTION

The novel polyamide polymers of the invention are the reaction product of a primary diamine, an aromatic, aliphatic or alicyclic dicarboxylic acid compound and a spirodilactam precursor. The spirodilactam precursor is a compound which, under the conditions of the process of the invention, reacts with the primary diamine reactant to produce the moiety of a [4.4] spirodilactam having spiro ring nitrogen atoms in the 1- and 6-spiro ring positions and is connected through the nitrogen atoms to the moieties derived from the primary diamine. In one embodiment of the invention the spirodilactam precursor is a ketodiacid compound and in another embodiment of the invention the spirodilactam precursor is an analogous spirodilactone.

In the embodiment wherein the spirodilactam precursor is a ketodicarboxylic acid compound, the acid compound is a ketodicarboxylic acid compound having two carbon atoms between the keto group and each carboxy function. In other terms, the ketodicarboxylic acid is a 4-oxoheptandioic acid compound. Although a variety of substituents in addition to the keto group and the carboxy functions are suitable for use in the process of the invention, the preferred 4-oxoheptanedioic acid compounds have up to 30 carbon atoms inclusive and are represented by the formula

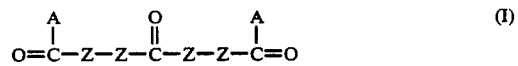

$$O=\overset{A}{\underset{}{C}}-Z-Z-\overset{O}{\underset{}{\overset{\parallel}{C}}}-Z-Z-\overset{A}{\underset{}{C}}=O \qquad (I)$$

wherein A independently is hydroxy, alkoxy, preferably lower alkoxy of up to 4 carbon atoms inclusive, or halo, preferably the middle halogens, chloro or bromo. The term Z independently is >C(Z')$_2$ in which Z' independently is hydrogen, lower alkyl, preferably methyl, halo, preferably the lower halogens fluoro or chloro, or aryl of up to 10 carbon atoms, preferably phenyl, or Z is such that adjacent Z groups form a ring system Z" of from 1 to 2 rings, each ring having from 5 to 7 ring atoms up to two of which are heteroatoms selected from nitrogen, oxygen or sulfur with the remainder of the ring atom being carbon atoms, there being up to 14 carbon atoms in each Z", two of which ring carbon atoms form a bridge between the spiro and/or the carbonyl carbon atom connected by the adjacent Z groups. When adjacent Z groups taken together form a ring system, Z" is otherwise hydrocarbyl containing only atoms of carbon and hydrogen besides any heteroatoms present or is substituted hydrocarbyl additionally containing other atoms present in the form of monovalent, inert, carbon atom substituents, e.g., halo atoms, preferably the middle halogens chloro or bromo, alkyl of 1 to 4 carbon atoms, or the like. Preferably, each Z" is 1 aromatic ring.

In one embodiment employing the ketodicarboxylic acid compound as the spirodilactam precursor, each Z moiety is >C(Z')₂ and the ketodiacid compound is an acyclic 4-oxoheptanedioic acid compound, i.e., a 4-oxoheptanedioic acid compound free from fused, cyclic substituents. Such 4-oxoheptanedioic acid compounds are represented by the formula

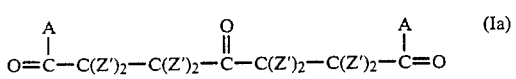

wherein A and Z' have the previously stated meanings. These 4-oxoheptanedioic acid compounds include 4-oxoheptanedioic acid, dimethyl 4-oxoheptanedioic, 2,6-dimethyl-4-oxoheptanedioic acid, 2,3,5,6-tetramethyl-4-oxoheptandioyl chloride, di-n-propyl 2,6-di-n-butyl-4-oxoheptandioyl chloride, di-n-propyl 2,6-di-n-butyl-4-oxoheptanedioate, 7-carbomethoxy-3,3,5,5-tetramethyl-4-oxoheptanoic acid and the like. The preferred compounds of formula Ia are those wherein each Z' is hydrogen or methyl, especially hydrogen, and each A is hydroxy or alkoxy, especially hydroxy.

These ketodiacid compounds are known compounds or are prepared by known methods. Certain of the esters of formula Ia, i.e., the compounds wherein each A is alkoxy and at least one Z' on each carbon atom adjacent to a carboxy function is hydrogen, are produced by reacting formaldehyde with an α,β-ethylenically unsaturated carboxylic acid ester such as methyl acrylate or ethyl methacrylate. The reaction is conducted in the presence of a catalyst system which comprises a thiazolium salt and a tertiary amine and produces the 4-oxoheptanedioate compound in good yield. This process is described and claimed in greater detail in U.S. Pat. No. 4,800,231 incorporated herein by reference. Conversion of the esters thereby obtained to corresponding free acids or acid halides is by conventional methods as is the general interconversion of the acids, esters or acid halides of formula Ia.

In a second embodiment of the ketodiacid as the spirodilactam precursor, the 4-oxoheptanedioic acid compound is cyclic, that is, incorporates cyclic substituents between the keto group and the carboxy functions, i.e., the adjacent Z moieties form a cyclic ring system Z"'. Such ketodicarboxylic acid compounds are represented by the formula

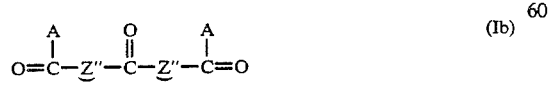

wherein A and Z" have the previously stated meanings. Illustrative of such cyclic ketodiacid compounds are di(2-carboxycyclohexyl) ketone. di(2-carboxyphenyl) ketone, di(2-carbopropoxycyclo-4-pentenyl) ketone, di(2-chlorocarbonylphenyl) ketone, di(2-carboxypyridyl) ketone, 2-carboxyphenyl N-methyl-3-carboxy-2-pyrryl ketone, di(3-carboethoxy)-2-morpholyl ketone, di(2-carbomethoxy-3-chlorophenyl) ketone and the like. The preferred ketodiacid compounds with cyclic substituents are those compounds of from 5 to 6 ring atoms and up to 1 nitrogen and/or oxygen heteroatom. Most preferred as a cyclic substituent is benzo.

The cyclic ketodiacid compounds of formula Ib are known compounds or are produced by known methods such as the method of U.S. Pat. No. 1,999,181 or the method of Cava et al, *J. Am. Chem. Soc.*, 77, 6022 (1955), incorporated herein by reference or the like.

In yet another embodiment of the ketodiacid compound as the spirodilactam precursor, the ketodiacid compound incorporates one cyclic substituent with the remainder of the Z moieties being acyclic, i.e., the compounds represented by the formula

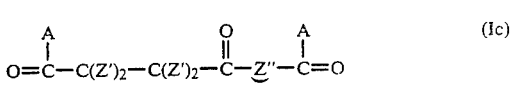

wherein A, Z' and Z" have the previously stated meanings. Such ketodiacids of one cyclic moiety are illustrated by 3-(2-carboxybenzoyl)propionic acid, 3-(3-carboethoxy-2-pyridyloyl)-2-ethylpropionic acid, ethyl 3(2-carboxy-4-methylbenzoyl)propionate, 3-(2-carboxybenzoyl)butyrl chloride and the like. The ketodiacids of formula Ic are known compounds or are produced by known methods. For example, 2-carbomethoxybenzaldehyde reacts with methyl acrylate according to the general teachings of U.S. Pat. No. 4,800,231 to produce methyl 3-(2-carbomethoxybenzoyl)propionate.

In a second embodiment of the process of the invention the spirodilactam precursor is a 1.6-dioxaspiro[4.4.]nonane-2.7-dione compound wherein the spirodilactone ring system is substituted with hydrogen, alkyl, halo or aryl, or the ring system incorporates fused ring substituents which include the 3- and 4- spiro ring positions and/or the 8- and 9- spiro ring positions. One class of such 1,6-dioxa [4.4] spirodilactones is represented by the formula

wherein Z has the previously stated meaning.

In the embodiment of these spirodilactam precursors wherein each Z is acyclic, the spirodilactone is represented by the formula

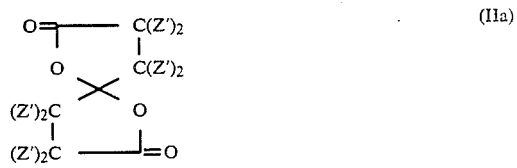

wherein Z' has the previously stated meaning. Illustrative of such spirodilactones are 1,6-dioxaspiro[4.4]nonane-2,7-dione, 3.8-dimethyl-1,6-dioxaspiro[4.4]nonane- 2,7-dione, 3,4,8,9-tetramethyl-1,6-dioxaspiro[4.4]nonane-2,7-dione, 3,3,8,8-tetramethyl-1,6-dioxaspiro[4.4]nonane-2,7-dione, 3,3,4,4,8,8,9,9-octamethyl-1,6-dioxospiro[4.4]nonane-2,7-dione and 3,4,8,9-tetrafluoro-1,6-dioxaspiro[4.4]nonane-2,7-dione. Preferred spirodilactones of the formula IIa are those wherein at least one Z' of each Z'-substituted carbon atom is hydrogen and further preferred are the spirodilactones of formula IIa wherein each Z' is hydrogen. The compounds of formula IIa are known compounds or are produced by known methods such as by the process of Pariza et al, *Synthetic Communications*, Vol. 13(3), pp. 243-254 (1983), incorporated herein by reference.

In the embodiment of the invention wherein the spirodilactone of formula II incorporates one cyclic substituent fused to each spiro ring, the spirodilactones are represented by the formula

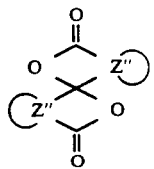
(IIb)

wherein Z" has the previously stated meaning. Typical compounds of formula IIb are 3,4,8,9-dibenzo-1,6-dioxaspiro[4.4]nonane-2,7-dione, 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-di(4-methylbenzo)-1,6-dioxaspiro[4.4]nonane-2,7-dione and 3,4,8,9-di(pyrido)-1,6-dioxaspiro[4.4]nonane-2,7-dione. These compounds are known compounds or are produced by known methods, for example, the process of the above Cava et al article or the process of U.S. Pat. No. 1,999,181.

In the embodiment where the spirodilactam precursor is a spirodilactone incorporating a fused cyclic substituent in one of the spiro rings but the other spiro ring is free of fused cyclic substituents, the spirodilactones are represented by the formula

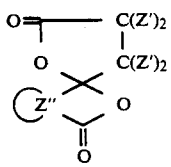
(IIc)

wherein Z' and Z" have the previously stated meanings. Such spirodilactones are illustrated by 3-methyl-8,9-benzo-1,6-dioxaspiro[4.4]nonane-2,7-dione, 3,4-benzo-1,6-dioxaspiro[4.4]nonane-2,7-dione and 3,3,4,4-tetramethyl-8,9-(2-morpholyl)-1,6-dioxaspiro[4.4]nonane-2,7-dione. The spirodilactones of the above formula IIc are known compounds or are produced by known methods such as the dehydration of the corresponding ketodiacid compound. By way of specific illustration, 3,4-benzo-1,6-dioxaspiro[4.4]nonane-2,7-dione is produced by dehydration of 3-(2-carboxybenzoyl)propionic acid through application of heat.

In general, the preferred spirodilactones for use as spirodilactam precursors are hydrocarbon except for the oxygen atoms of the lactone moieties, particularly those spirodilactones which are free from fused cyclic substituents (formula IIa) or those which have a fused cyclic substituent on each of the spiro rings (formula IIb). The spirodilactone 1,6-dioxaspiro[4.4]nonane-2,7-dione is an especially preferred member among members of the former class whereas 3,4,8,9-dibenzo-1,6-dioxaspiro[4.4]-nonane-2,7-dione is an especially preferred member of the latter class.

The spirodilactam precursor is reacted, according to the process of the invention, with an aromatic, alicyclic or aliphatic dicarboxylic acid compound and a primary diamine or an acid addition salt thereof. Primary diamines are those organic compounds which have two primary amino groups, i.e., —NH$_2$ groups, as carbon atom substituents. While reaction to produce the polyamideimide polymers of the invention will take place with a variety of primary diamines of varying structure, best results are obtained in the process of the invention of the two amino groups are not located on adjacent carbon atoms, that is, at least three atoms separate the two primary amino groups. One such class of primary diamines comprises diamines of up to 30 carbon atoms inclusive which are represented by the formula $$H_2N—R—NH_2(.HY)_m \quad (III)$$

wherein m is 0 or 1; HY is an acid which forms a salt with the amine, including both inorganic and organic acids which do not interfere with the reaction, such as hydrohalogenic acids, such as hydrochloric and hydrobromic; sulfur acids, such as sulfuric or sulfonic; phosphorus acid, such as phosphoric or phosphonic; and organic acids, such as oxalic acid and the like, preferably Y is halogen, e.g., fluorine, chlorine, bromine or iodine, but is preferably middle halogen chlorine or bromine; R is a divalent organic radical of up to 30 carbon atoms inclusive and is divalent alkylene or divalent arylene of from 1 to 2 aromatic rings inclusive which, when two aromtic rings are present, incorporates rings which are fused or which are connected by a moiety X wherein X is a direct valence bond, alkylene of up to 8 carbon atoms inclusive, oxy, thio, sulfonyl, carbonyl, dioxyphenylene, i.e.

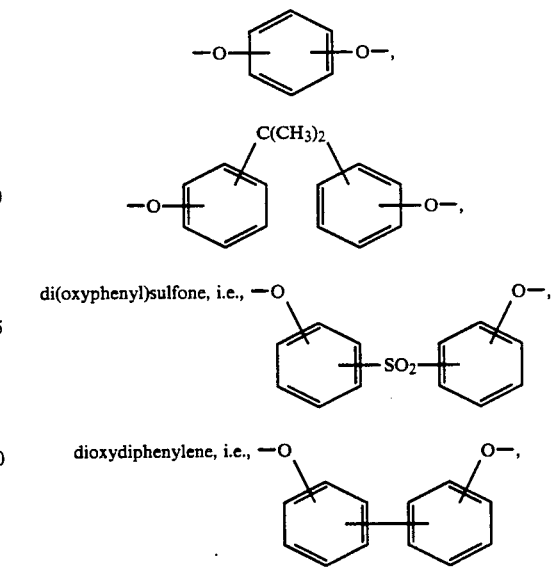

with the proviso that the two amino groups are not located on adjacent atoms. R is preferably hydrocarbyl containing only atoms of carbon and hydrogen besides the additional atoms of divalent linking groups but may also be substituted hydrocarbyl containing other atoms such as halogen, preferably middle halogen, as inert monovalent carbon atom substituents.

Illustrative of the alkylene-containing primary diamines of formula III include trimethylenediamine, tetramethylenediamine, hexamethylenediamine, octamethylenediamine, 1 7-diamino-4-methyloctane, 1,4-diaminocyclohexane, di(4-amino-cyclohexyl)methane, dodecamethylenediamine, 1,6-diamino-3-4-diethylhexane and the like. Arylene diamines of the above formula III include 1,4-phenylenediamine, 2,4-toluenediamine, 4,4'-diaminobiphenyl, 1,5-diaminonaphthalene, di(3-aminophenyl) ether, di(4-aminophenyl)methane, 2,2-di(3-amino-4-methylphenyl)propane, di(4-amino-2-ethylphenyl) sulfone, di(3-amino-4-bromophenyl) ketone, di(2-aminophenyl) sulfide, 1,3-di(3-aminophenyloxy)benzene, 2,2-di[4-(4-aminophenyloxy)-phenyl)]propane, 4,4,-di(4-aminophenyloxy)biphenyl and the like. The preferred primary diamines of the above formula III are those wherein R is divalent arylene and which are otherwise hydrocarbyl execpt for any additional atoms of divalent linking groups. Particularly preferred are the di(aminophenyl)alkanes, especially the di(4-aminophenyl)alkanes, such as di(4-aminophenyl)methane.

In the reaction of the invention the spirodilactam precursor and the primary diamine react with an aromatic, aliphatic or alicyclic dicarboxylic acid compound which will suitably have two of the carboxy functions on non-adjacent carbon atoms of the same aromatic ring as free carboxyl groups (—CO$_2$H groups), as halides thereof or together as a linear anhydride moiety. A preferred class of acids comprises aromatic, alicyclic, or aliphatic dicarboxylic acid compounds having up to 30 carbon atoms in each acid compound and up to 3 rings, inclusive, including those represented by the formula

HO$_2$C—R'—X'(R')$_r$—CO$_2$H        (IV)

wherein X' is X, R' is an aromatic, aliphatic or alicyclic divalent group of up to 15 carbon atoms and from 1 to 2 rings and r is 0 or 1. R' is preferably hydrocarbyl but may be substituted hydrocarbyl containing additional atoms as inert carbon atom substituents, e.g., halogen atoms and preferably the middle halogens, alkyl of 1 to 4 carbon atoms, and the like. As mentioned above, acid halides or anhydrides are also suitable acid compound reactants.

Illustrative of the aromatic, aliphatic or alicyclic dicarboxylic acid compounds which are useful in the process of the invention include adipic acid, phthalic acid, 2,3-naphthalenedicarboxylic acid, terphthalic acid chloride, 2,2-di(4-carboxyphenyl)propane, isophthalic acid, phthalic anhydride, 4,4',-biphenyl ether dicarboxylic acid;, bis(4-carboxyphenyl) sulfone, 2,6-naphthalene-dicarboxylic acid, furandicarboxylic acid, pyridinedicarboxylic acid, 1,2-cyclohexanedicarboxylic acid, malonic acid, oxalic acid, cyclopentanedicarboxylic acid, pimelic acid and the like or any of the acids disclosed in U.S. Pat. Nos. 4,866,155, 4,876,327, 4,868,062 and 4,829,144, the disclosures of which are incorporated herein by reference. In general hyrocarbon R' groups are preferred as the reactant of formula IV, and particularly preferred are those where r is 0 and X' is a direct valence bond. Such aromatic dicarboxylic acid compounds of one aromatic ring give best results, particularly isophthalic acid.

The reaction of the spirodilactam precursor, the primary diamine and the dicarboxylic acid compound is conducted in the liquid phase in the presence of an inert reaction diluent. Diluents which are liquid at reaction conditions and in which the reactants are at least partially soluble at reaction temperature are satisfactory. Suitable diluents include the N-alkylamides such as N,N-dimethylformamide, N,N-dimethylacetamide and N-methyl-2-pyrrolidone, phenols such as phenol and m-cresol, sulfur-containing diluents such as dimethylsulfoxide, sulfolane or the like.

The polymerization is conducted by contacting the reactants in a suitable reactor under polymerization conditions and maintaining reactant contact by conventional methods such as shaking or stirring. The relative properties of the reactants may vary within certain limits and the properties of the resulting polymer will vary accordingly. The molar ratio of spirodilactam precursor to dicarboxylic acid compound is suitably from about 95:5 to about 5:95 but preferably will be from about 4:1 to about 1:4. As the primary diamine reacts with both the spirodilactam precursor and the dicarboxylic acid compound, the molar quantity of the primary diamine should preferably be about equal to the total molar quantity of the other two reactants. Molar ratios of primary diamine to total spirodilactam precursor plus dicarboxylic acid compound from about 5:1 to about 1:5 are satisfactory but molar ratios of from about 2:1 to about 1:2 are preferred.

The polymerization is conducted at an elevated temperature. Reaction temperatures from about 80° C. to about 250° C. are suitable with preferred reaction temperatures being from about 120° C. to about 200° C. A suitable reaction pressure is one which will maintain the reaction mixture in a liquid phase. Such pressures are typically up to about 20 atmospheres but more often are from about 0.8 atmospheres to about 10 atmospheres. During reaction, any water present or formed is preferably removed by conventional procedures such as selective extraction or distillation, preferably azeotropic distillation with a portion of the reaction diluent or with a second reaction diluent with which water forms an azeotrope, e.g., toluene or ethylbenzene. Subsequent to reaction, the polymer product is recovered by conventional methods such as solvent removal, extraction or precipitation.

The polymer product is a polyamide containing amide linkages. The amide linkages result from spirodilactam moiety formation or from reaction of the carboxy functions of the carboxylic acid compound with the primary diamine. The polymer product thus contains moieties of the non-amino portion of a primary diamine alternating with (1) a 1,6-diaza [4.4] spirodilactam moiety connected to the remainder of the polymer chain through the spiro ring nitrogen atoms and with (2) a moiety of the aromatic or aliphatic dicarboxylic acid compound derived by the loss of hydroxyl groups or anhydride oxygen equivalent. In terms of the reactants as depicted above (formulas I or II, III and IV) the polymer products are represented by the repeating formula V

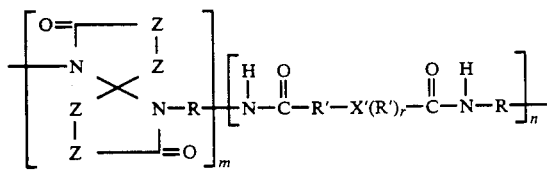

wherein Z, R, R', X and r have the previously stated meaning and the ratio of m:n is from about 95:5 to about 5:95, preferably from about 4:1 to about 1:4. Of particular interest are the polymers of formula V having a molecular weight from about 10,000 to about 100,000.

The nomenclature of the polymer products of the formula V is not easily determined because of the complexity thereof, but the identity of the products will be apparent from the above discussion of the reactants and consideration of the formula for the products as depicted above. Illustrative of such products is the polymer illustratively produced from 4-oxoheptanedioic acid or 1,6-dioxaspiro[4.4]nonane-2,7-dione, di(4-aminophenyl)methane and terephthaloyl acid chloride, the polymer product produced from 2,3,5,6-tetramethyl-4-oxoheptanedioic acid or 3,4,8,9-tetramethyl-1,6-dioxaspiro[4.4]nonane-2,7-dione, p-phenylenediamine and adipic acid and the polymer illustratively produced from di(2-carboxyphenyl)ketone or 3,4,8,9-dibenzo-1,6-dioxaspiro[4.4]nonane-2,7-dione, 2,2-di(4-aminophenyl)propane and phthalic anhydride. Preferred polymer products are those of the above formula V wherein Z is $>C(Z')_2$ in which $Z'$ is hydrogen or methyl, R is divalent arylene, r is 0 and R' is a direct valence bond.

The polymer product is a thermoplastic polymer of relatively high glass transition temperature, typically over 150° C. and often over 250° C. The polymer product is processed by the conventional techniques associated with thermoplastics such as injection molding and extrusion into sheets, films, fibers and shaped articles which demonstrate good resistance to common solvents. Because of the relatively high glass transition temperatures exhibited by the polymers they are useful as engineering thermoplastics where elevated temperatures are likely to be encountered. Such applications include the production of containers for food and drink and base materials for electrical and electronic applications.

The invention is further illustrated by the following Illustrative Embodiment which should not be construed as limiting the invention.

Illustrative Embodiment

A mixture of 1.56 g (0.01 mole) of 1,6-dioxaspiro[4.4-]nonane2,7-dione. 1.66 g (0.01 mole) of isophthalic acid, 39.6 g (0.02 mole) of di(4-aminophenyl)methane. 10 ml of pyridine and 40 ml of N-methyl-2-pyrrolidone was heated, while being stirred, and the water present or formed was removed by azeotropic distillation. When the water removal was complete the temperature of the mixture was raised to 170°-180° C. and maintained at that temperature for 12 hours. After cooling, the resulting mixture was poured into methanol. The precipitated polyamide polymer product was and dried in a vacuum over at 170° C. for 24 hours. The nuclear magnetic resonance spectra were consistent with a polymer having diphenylenemethane units alternating with units of a 1,6-diaza [4.4] spirodilactam and units of

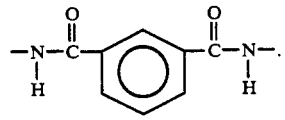

What is claimed is:

1. The polymer represented by the repeating formula

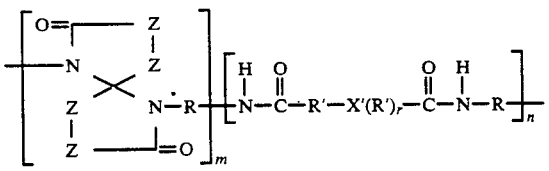

wherein Z independently is $>C(Z')_2$ in which $Z'$ independently is hydrogen, lower alkyl, aryl of up to 10 carbon atoms or lower halo; R has up to 30 carbon atoms inclusive and is an arylene group of from 1 to 2 aromatic rings which, when two rings are present are fused or joined by X; X is a direct valence bond or X is alkylene of up to 8 carbon atoms inclusive, oxy, thio, sulfonyl, dioxyphenylene, 2,2-di(oxyphenyl)propane, di(oxyphenyl) sulfone or dioxydiphenylene; X' is a direct valence bond or X' is alkylene of up to 8 carbon atoms inclusive, oxy, thio, sulfonyl, dioxyphenylene, 2,2-di(oxyphenyl)propane, di(oxyphenyl) sulfone or dioxydiphenylene; R' independently is an aromatic group of up to 15 carbon atoms and from 1 to 2 rings, r is 0 or 1, and the ratio of m:n is from about 95:5 to about 5:95.

2. The polymer of claim 1 wherein r is 0 and X and X' are direct valence bonds and the ratio of m:n is from about 4:1 to about 1:4.

3. The polymer of claim 2 wherein Z is $>C(Z')_2$ in which $Z'$ is hydrogen or methyl.

4. The polymer of claim 3 wherein R is di(phenylene) alkane.

5. The polymer of claim 4 wherein $Z'$ is hydrogen.

6. The polymer of claim 5 wherein di(phenylene)alkane is di(4-phenylene) methane.

* * * * *